UNITED STATES PATENT OFFICE.

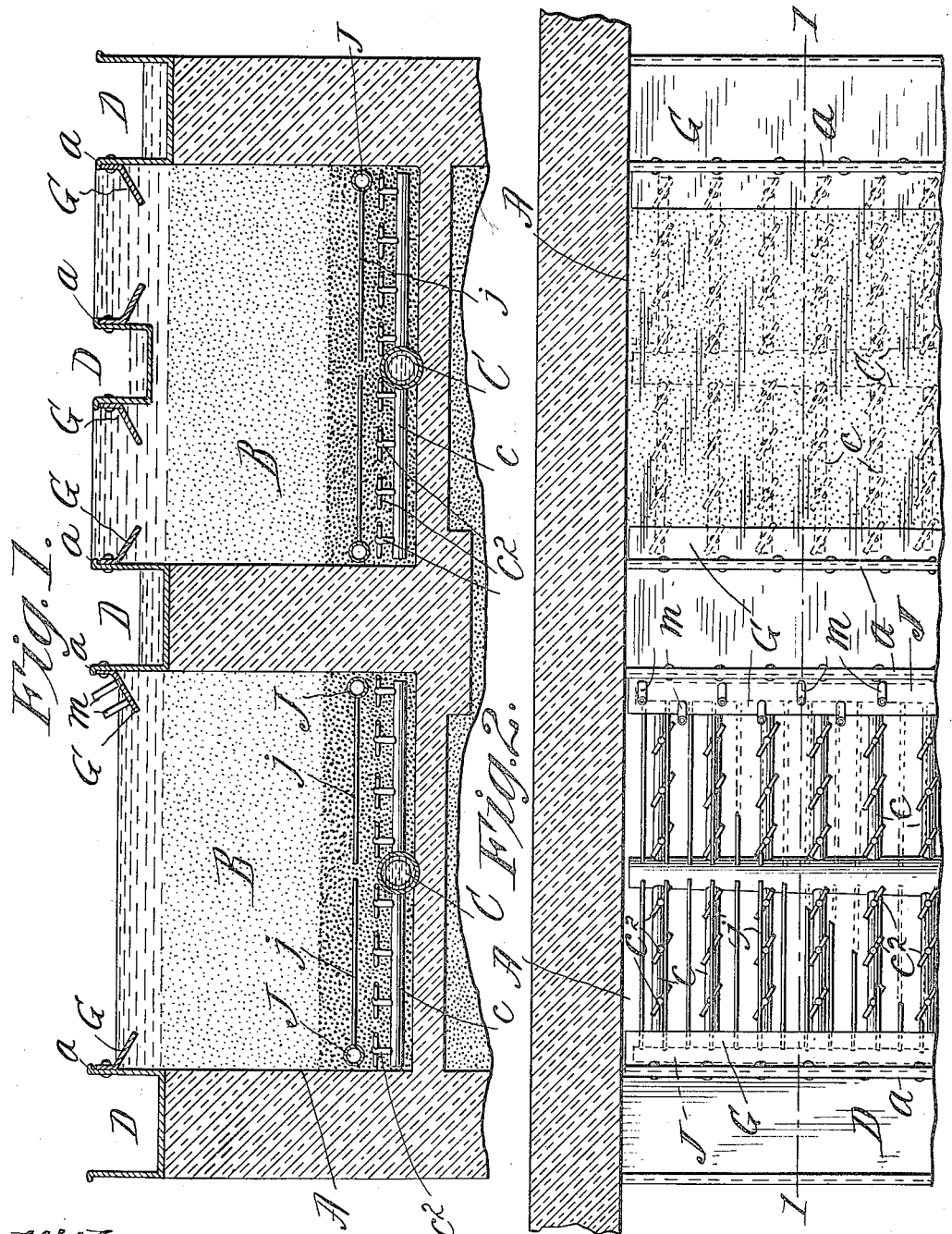

WILLIAM W. WILSON, OF HOLYOKE, MASSACHUSETTS.

FILTERING APPARATUS.

No. 798,473.     Specification of Letters Patent.     Patented Aug. 29, 1905.

Application filed June 7, 1904. Serial No. 211,497.

*To all whom it may concern:*

Be it known that I, WILLIAM W. WILSON, a citizen of the United States of America, and a resident of Holyoke, in the county of Hampden and State of Massachusetts, have invented certain new and useful Improvements in Filtering Apparatus, of which the following is a full, clear, and exact description.

This invention relates to improvements in filtering apparatus or beds available for the filtration of large quantities of water to be used in paper manufactories or otherwise where large quantities of clean water are required.
The invention relates to the class of filtering apparatus of the general description found in Letters Patent of the United States, granted to me April 17, 1900, No. 647,780; and February 19, 1901, No. 668,344, in which there are comprised a filtering receptacle or basin having a bed or body of filtering material, such as sand or sand combined with other suitable substance, a pipe or pipes having series of branches and through which currents of water may be forced in an inward direction upwardly throughout the entire filtering-bed, loosening or opening up the sand therein, cleansing the sand, at the same time raising the water-level above the filter-bed, and all so arranged that the wash-water may overflow at one or more of the side walls of the receptacle to be carried away in or discharged from a receiver or canal therefor, and in this description of filtering apparatus and as more particularly represented in the second above-named patent provision is made for the introduction from the bottom and upwardly through the filter-bed of currents of air which are operable to increase the loosening or opening up of the filtering material, and in this class of filters I have found that in the cleansing operation using the reverse flow of wash-water or using currents both of water and also air concurrently therewith the foul water forced and flowing over the edges of the side walls of the filter receptacle or basin into the receiving-canals therefor carries with it a considerable quantity of the sand in suspension therewith, resulting disadvantageously, in that replenishment in the filter-bed is required and also in that discharge-conduits for the wash-water become liable to be choked up or clogged; and the object of this invention is to provide in a simple yet effective manner means which without obstructing the freedom of clearance from the filter-bed of the wash-water in the filter-cleansing operation acts as a guard or break to intercept the sand which is in suspension in the wash-water and most especially at and along the surface of the wall leading upwardly to the overflow edge; and the invention consists of a filtering-receptacle having a suitable comminuted filtering material therein and having means in the lower portion thereof for introducing a distributed supply of wash-water thereinto, the said receptacle having adjacent its upper overflow edge or edges a guard projected in an inward direction and operable to intercept and prevent the overflowing of the sand from the receptacle with the foul water.

The expedient may be carried out in various forms, and in the accompanying drawings a desirable and efficient embodiment of the same in and as a part of the filtering apparatus is illustrated.

Figure 1 is a vertical cross-sectional view through a double filter-bed with the provisions of this invention thereon. Fig. 2 is a plan view. The line 1 1 on Fig. 2 indicates the plane on which the section, Fig. 1, is taken.

Similar characters of reference indicate corresponding parts in both views.

In the drawings, A A represent basins or filter-receptacles, of which B are the beds of the filtering material, consisting of sand or layers of gravel and sand or any other suitable comminuted material or combinations of material having fitness to the purpose. In the bottom of each filtering-receptacle is a main water-pipe C, having a multiplicity of branches $c$, each provided with a series of collector-tubes $c^2$, made suitably slitted or foraminous, as well known, the collector system in the ordinary working of the filter taking the filtered water which gravitates through the bed and delivering it through the main pipe for service.

In this class of filters it is common to have combined with the collector system means for causing a reverse flow of clean water therethrough effective to cleanse the filtering-body, and the level of the water being raised above the normal water-level in the basin such wash-water, with the impurities carried therewith, will flow over the edges of the overflow-walls $a$ $a$ of canals D or receivers for such refuse foul water. The canals or receivers for the wash-water are practically located at the upper edges of one or more side walls of the filter-basin and may be considered as parts of the side-wall constructions, either by being formed as channels therein made in masonry, as in my former patent first herein referred to or by being constituted of cast or sheet metal and mounted on the upper edges of the side walls, and again in some cases the overflow-walls may, as represented in the right-hand department of Fig. 1, be the walls of a trough held supported at the suitable height for receiving the overflow between the walls proper of the basin, such being a desirable provision in unusually-wide filter-beds.

The overflow-walls, however constituted and wherever located, are provided with sand-intercepting guards G, located suitably adjacent the upper edges of the overflow-walls, and while the particular form and arrangement of these guards may be quite widely varied a practical form is that shown in which the guards are represented in the form of long flat strips downwardly and inwardly inclined, the same advantageously being constituted by thin metallic strips or bars bent in the form of an obtuse angle, one section thereof being placed against and riveted to the side of the overflow-wall.

In addition to the provision for the reverse flow of a wash-water provision is also commonly made for introducing inward and upwardly directed currents of air through the filter-bed, the same opening up or loosening the sand and agitating it further than would be done by the water-currents, and J represents air-pipes with air-pipe branches j located in a lower portion of the filter-bed and constituting the medium through which air under pressure and from a suitable source may be carried and distributed in and through the bed; but this invention is not limited to the provision of this particular means for the introduction of the air, nor, in fact, to any means therefor, as other provisions for the result may be utilized or either the air or the water currents might not be simultaneously employed; but the action of agitation and whatever may cause the raising of the water-level above the filter-bed and the overflow thereof, tending to carry more or less of the sand or fine filtering material therewith, will be counteracted by the provision of the sand-guards arranged for operation substantially as described. These sand-guards have been found effective and extremely useful in actual demonstration, the loss of sand in overflow when they are used being inconsiderable.

In order that the air which is apt to form currents of greatest intensity upwardly alongside the side walls of the basin leading to the overflow edges of such walls may be relieved, the sand-guards G may have series of tubes $m$ $m$ carried thereby, said tubes at their lower ends opening to the under side of the sand-guards, while their upper end portions are projected above the water-overflow level.

Having thus described my invention, what I claim, and desire to secure by Letters Patent, is—

1. In a filtering apparatus, a filtering-receptacle having a body of filtering material therein, and conduits thereunder for the introduction into the receptacle of fluid currents for clearing and cleaning the filtering material, an overflow-wall for said receptacle, a sand-intercepting guard-strip projecting from the said wall toward the interior of the receptacle, said guard extending longitudinally throughout the length of the wall, a plurality of upwardly-extending pipe-sections carried by the guard-strip, said pipe-sections opening both above and below the said guard-strip, and a trough-like canal arranged adjacent to and parallel with the overflow-wall.

2. In a filtering apparatus, a filtering-receptacle having a body of comminuted filtering material therein, and conduits thereunder for the introduction into the receptacle of fluid currents for clearing and cleansing the filtering material, and said receptacle having an overflow-wall provided near its upper edge with a downwardly and inwardly inclined sand-guard strip having one or more pipe-sections open both at the under sides of the guard-strip and at their ends upwardly projecting above said strip.

Signed by me at Springfield, Massachusetts, in presence of two subscribing witnesses.

WILLIAM W. WILSON.

Witnesses:
WM. S. BELLOWS,
A. V. LEAHY.